Aug. 25, 1931.     B. LOEFFLER     1,820,748
LUBRICATING DEVICE FOR CLUTCH THROW-OUT BEARINGS
Filed Sept. 12, 1929
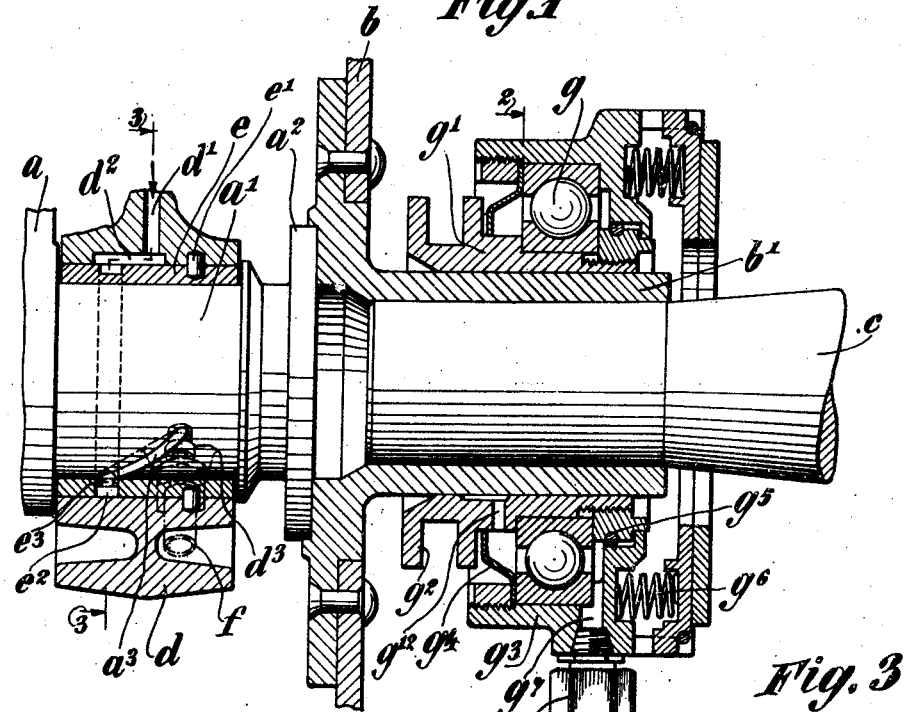
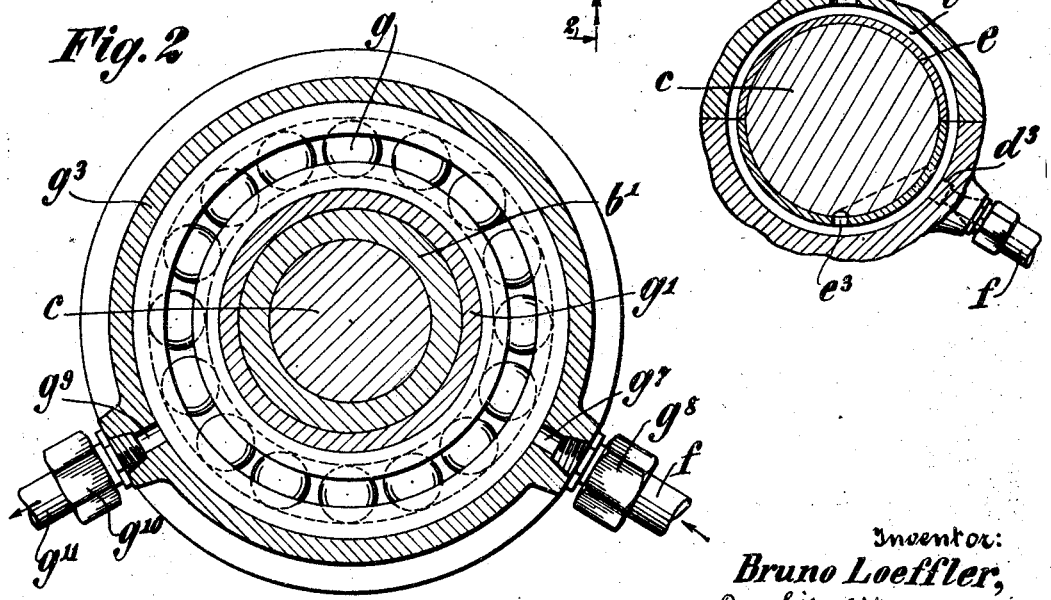
Inventor:
Bruno Loeffler,
By his attorneys:
Redding, Greeley, O'Shea & Campbell Patented Aug. 25, 1931

1,820,748

UNITED STATES PATENT OFFICE

BRUNO LOEFFLER, OF PLAINFIELD, NEW JERSEY, ASSIGNOR TO INTERNATIONAL MOTOR COMPANY, OF NEW YORK, N. Y., A CORPORATION OF DELAWARE

LUBRICATING DEVICE FOR CLUTCH THROW OUT BEARINGS

Application filed September 12, 1929. Serial No. 392,080.

The present invention relates to lubricating systems and embodies, more specifically, an improved means for lubricating clutch throw out bearings used particularly in motor vehicles.

In view of the fact that clutch throw out bearings move with respect to the stationary elements of the clutch, and yet with respect to a third element, lubrication thereof is extremely difficult and systems employed today have been found to be entirely inadequate for the effective lubrication of such bearings. The present invention embodies an improved system for continually and effectively lubricating clutch throw out bearings and is readily incorporated in existing structures and designs.

An object of the invention, accordingly, is to provide a lubricating system for effectively lubricating clutch throw out bearings.

A further object of the invention is to provide a system which may function in connection with the usual lubricating system for the crank shaft to lubricate the clutch throw out bearing either continuously or periodically.

A further object of the invention is to provide a lubricating system of the above character which is simple in operation and construction and which affords an unfailing supply of lubricant for the clutch throw out bearing.

Further objects, not specifically enumerated above, will be apparent as the invention is described in greater detail in connection with the accompanying drawings, wherein:

Figure 1 is a view in section, taken through the axis of the main bearing of a crank shaft and the clutch elements associated therewith.

Figure 2 is a view in section, taken on line 2—2 of Figure 1, and looking in the direction of the arrows.

Figure 3 is a view in section, taken on line 3—3 of Figure 1, and looking in the direction of the arrows.

Referring more particularly to the above drawings, $a$ designates a crank shaft having a main bearing $a'$ and an extension $a^2$ to which a clutch element $b$ is connected. A driven shaft $c$ is shown mounted within a sleeve $b'$ upon the clutch and a bearing support $d$ is provided for mounting the main bearing $a'$ of the crank shaft. A duct $d'$ is formed in the main bearing and carries a supply of lubricant from a reservoir or pump to a recess $d^2$, adjacent the main bearing $a'$.

A bearing sleeve $e$ is carried by the bearing support $d$ and secured thereto by means of pins $e'$. A circumferential groove $e^2$ is formed on the outer periphery of the bearing member $e$ and communicates with the recess $d^2$. A radial port $e^3$ causes the groove $e^2$ to communicate with the bearing $a'$ at a given point. A diagonal groove $a^3$ is formed in the main bearing $a'$ and extends to a transverse plane including a port $d^3$ in the bearing support.

A flexible tubular cable $f$ is connected to the bearing support and communicates with the port $d^3$ to carry lubricant therefrom to the clutch throw out bearing.

The clutch throw out bearing is shown at $g$ and is mounted upon a sleeve $g'$ formed with a yoke engaging groove $g^2$ of the usual character. An outer sleeve $g^3$ serves as a closure for the bearing and oil seals $g^4$ and $g^5$ are provided to maintain the bearing tight. Clutch throw out springs $g^6$, of the usual form, are provided and further description of these elements is believed unnecessary herein in view of the fact that they may be of standard form and constitute no part of the present invention.

A duct $g^7$ is drilled in the outer sleeve $g^3$ and carries a fitting $g^8$ to which the other end of the tubular cable $f$ is secured. Lubricant is thus supplied the bearing $g$ from the cable $f$ and the excess lubricant is carried away through a return port $g^9$ in the outer member $g^3$, fitting $g^{10}$ and tubular cable $g^{11}$ to the oil sump. It will be seen that an oil level is maintained in the throw out bearing which effectively lubricates such bearing and insures an adequate supply of lubricant thereto at all times. Every rotation of the crank shaft supplies a fresh impulse of lubricant thereto through the connections described above and an auxiliary duct $g^{12}$ may be provided for lubricating the bearing between sleeves $b'$ and $g'$.

While the invention has been described with specific reference to the accompanying drawings, it is not to be limited, save as defined in the appended claims.

What I claim is:

1. In combination with a crank shaft and a clutch driven thereby, a yoke actuated sleeve, a clutch throw out bearing carried by the sleeve, a bearing support for the shaft, a source of lubricant under pressure carried by the bearing support and communicating with the shaft, an offset groove in the shaft communicating with the source, a second duct in the bearing support communicating with the last named groove, a flexible conduit connecting the second duct with the throw out bearing, a duct in the sleeve communicating between the inner periphery thereof and the bearing, and a second flexible conduit communicating with the bearing at a desired oil level therein to carry off lubricant therefrom.

2. In combination with a crank shaft and a clutch driven thereby, a clutch throw out bearing, a bearing support for the shaft, a source of lubricant under pressure carried by the bearing support and communicating with the shaft, an offset groove in the shaft communicating with the source, a second duct in the bearing support communicating with the last named groove, a flexible conduit connecting the second duct with the throw out bearing, and a second flexible conduit communicating with the bearing at a desired oil level therein to carry off lubricant therefrom.

3. In combination with a crank shaft and a clutch driven thereby, a clutch throw out bearing, a bearing support for the shaft, a source of lubricant under pressure carried by the bearing support and communicating with the shaft, a groove in the shaft communicating with the source, a second duct in the bearing support communicating with the last named groove, a flexible conduit connecting the second duct with the throw out bearing, and a second flexible conduit communicating with the bearing at a desired oil level therein to carry off lubricant therefrom.

4. In combination with a crank shaft and a clutch driven thereby, a clutch throw out bearing, a bearing support for the shaft, a source of lubricant under pressure carried by the bearing support and communicating with the shaft, means on the shaft and support to supply lubricant intermittently from the source, a flexible conduit connecting the second duct with the throw out bearing, and a second flexible conduit communicating with the bearing at a desired oil level therein to carry off the lubricant therefrom.

This specification signed this 6th day of Sept. A. D. 1929.

BRUNO LOEFFLER.